July 4, 1944.  A. F. MILLER  2,352,797
VARIABLE INTERMITTENT MOTION DEVICE
Filed July 12, 1941  3 Sheets-Sheet 1
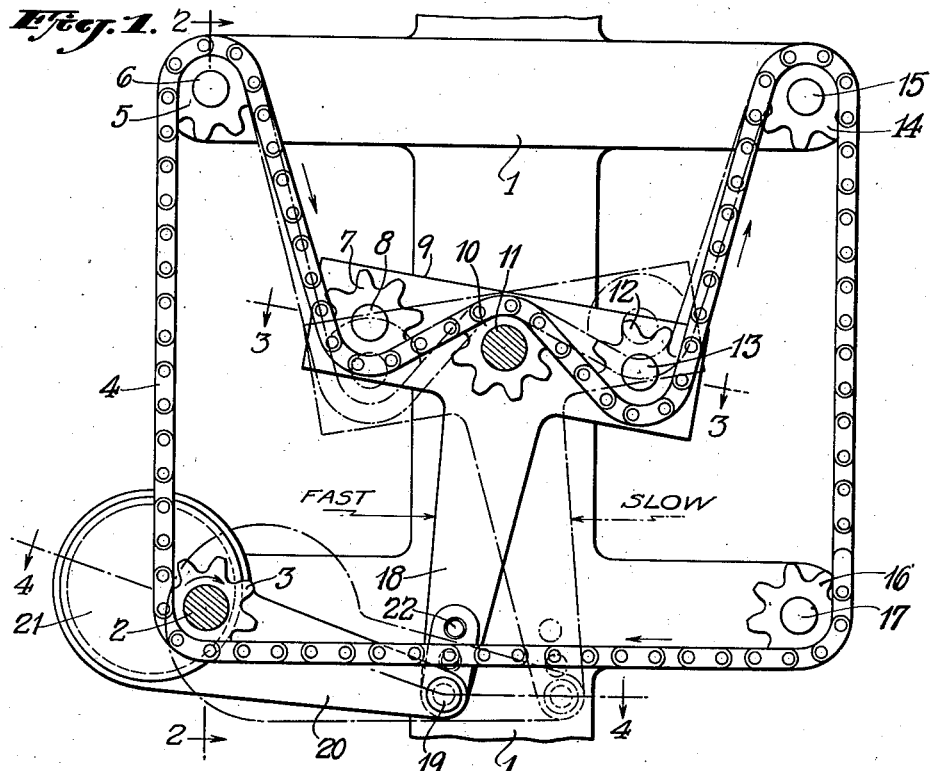
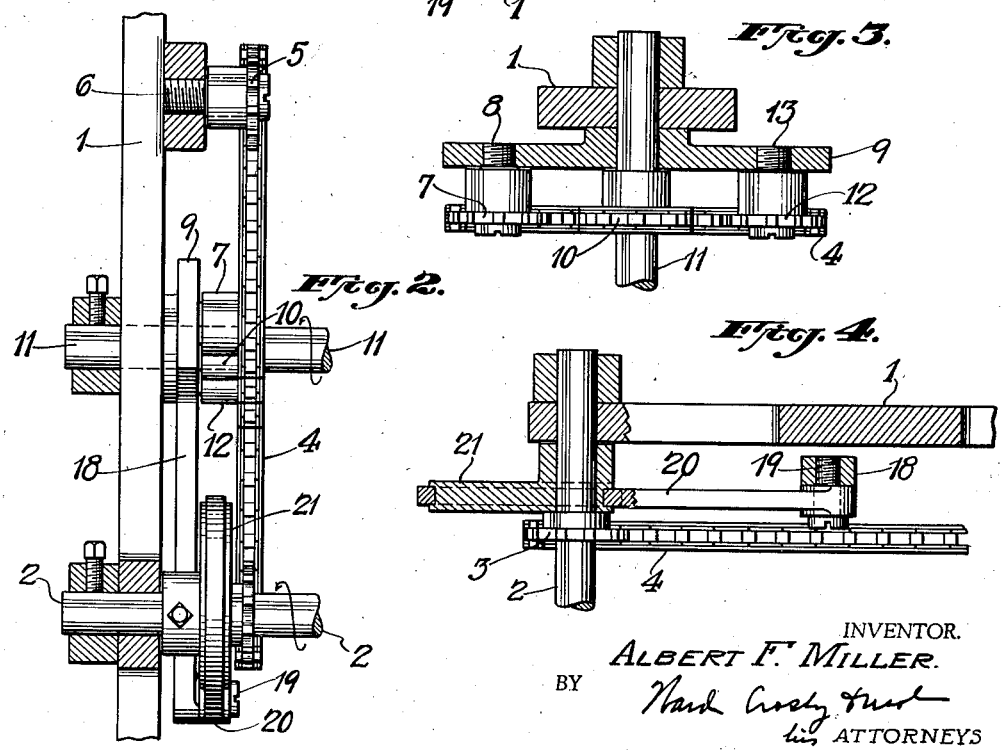
INVENTOR.
ALBERT F. MILLER.
BY
his ATTORNEYS

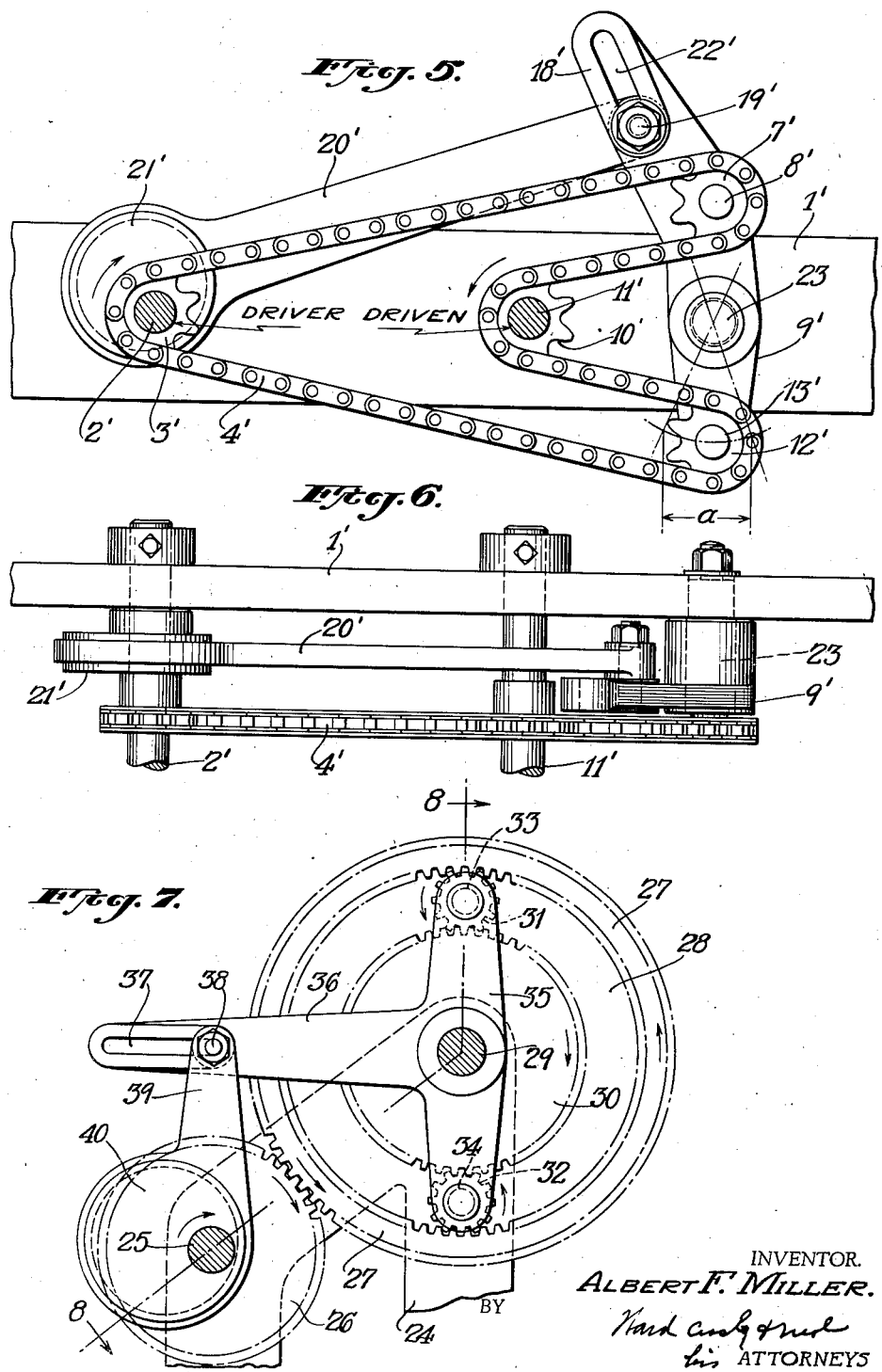

July 4, 1944.            A. F. MILLER            2,352,797
                VARIABLE INTERMITTENT MOTION DEVICE
                Filed July 12, 1941        3 Sheets-Sheet 3

INVENTOR.
ALBERT F. MILLER.
BY
his ATTORNEYS

Patented July 4, 1944

2,352,797

UNITED STATES PATENT OFFICE 2,352,797

VARIABLE INTERMITTENT MOTION DEVICE

Albert F. Miller, Flushing, N. Y., assignor to Lily-Tulip Cup Corporation, New York, N. Y., a corporation of Delaware Application June 12, 1941, Serial No. 402,140

5 Claims. (Cl. 74—217)

This invention relates to variable intermittent motion mechanisms and more especially to that class of mechanism wherein it is desired to convert substantially uniform continuous speed motion into intermittent variable speed motion. The invention is useful for intermittently varying the speed of a shaft or other moving part throughout a wide range of variations. For example, the speed of said part may be varied through a range from the maximum down to a minimum greater than 0; from a maximum down to 0; or from a maximum down to less than 0; (thus effecting an intermittent reversal of movement).

As is well known to those skilled in the art, such a mechanism is useful in or in conjunction with various forms of machines necessitating the intermittent movement of a part or parts, or the variable movement of such a part or parts, etc. Previously known mechanisms for effecting intermittent motion or variable motion (illustrative of which are the conventional pawl and ratchet and the elliptical gear arrangements) have not proven entirely successful and where a substantial amount of power is required to be transmitted devices heretofore known have been highly unsatisfactory; in some instances involving a relatively large cost and in other instances additionally involving considerable up-keep expense and replacement.

As illustrative of machines in conjunction with which intermittent movement of parts is required, attention is called to Reifsnyder Patent No. 1,608,617 for Machine for assembling containers, in which a chain conveyor is required to have an intermittent motion so as to bring articles carried thereby into a position of rest at certain intervals; Reifsnyder Patent No. 1,602,836 in which a table conveyor is intermittently rotated so as to come to rest at predetermined periods; and Claussen & Claus Patent No. 1,055,320 in which a relatively long conveyor chain is required to come to rest intermittently.

In addition to the disadvantages previously noted with respect to previously known devices of this sort it is well known to those skilled in the art that repeated stopping and starting of moving parts, and more especially relatively long chain conveyors and the like, subjects such mechanisms to relatively great strains with attendant upkeep trouble and expense.

An object of this invention is to provide an efficient and durable mechanism capable of economical manufacture and maintenance and adapted to convert substantially uniform continuous motion into variable intermittent motion.

Another object of the invention is to provide a device which is capable of gradually varying the motion of a conveyor or the like through a wide range of speeds to thereby prevent excessive strains.

The invention consists in the novel features of construction, arrangement and combination of parts embodied, by way of example, in the apparatus hereinafter described as illustrating the preferred form of the invention, and the invention will be more particularly pointed out in the appended claims.

Further objects and advantages of the invention will more fully appear from the following description taken in connection with the accompanying drawings which show, by way of example, the present preferred embodiments of the invention.

Referring to the accompanying drawings in which the same reference characters indicate the same parts in the various views:

Fig. 1 is a side elevation of one embodiment of the invention, with certain parts broken away;

Fig. 2 is a sectional view taken at 2—2 of Fig. 1;

Fig. 3 is a sectional view taken at 3—3 of Fig. 1;

Fig. 4 is a sectional view taken at 4—4 of Fig. 1;

Fig. 5 is a side elevation of a modified form of the invention illustrated in Fig. 1;

Fig. 6 is a plan view of the device shown in Fig. 5;

Fig. 7 is a side elevation of another embodiment of the invention wherein a gear train is used to transmit power instead of the sprocket and chain power train illustrated in the previous embodiments;

Figure 9:
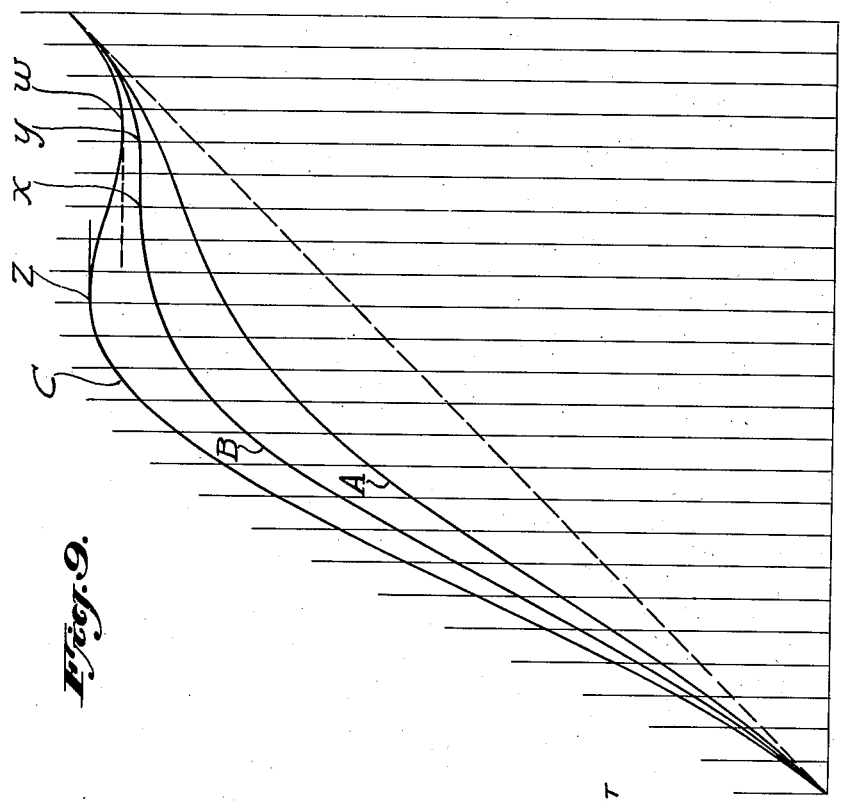
Fig. 9 is a speed chart showing relative variations for different adjustments of the embodiment illustrated in Figs. 5 and 6.

Referring more particularly to Fig. 1, 1 shows a portion of a suitable frame for supporting the several parts of the device. A drive member such as the driving shaft 2 is suitably journalled in the frame 1 and is adapted to be driven at a substantially uniform constant speed by a suitable source of power (not shown). The shaft 2 carries fixed thereto a driving sprocket 3 which is engaged by a continuous chain 4 which passes over an idle sprocket 5 freely journalled on a fixed axis 6 secured to the frame 1, under an idle sprocket 7 freely journalled on an axis 8 which is carried by a supporting frame 9, over a driven sprocket 10 which is fixed to a driven shaft 11 suitably journalled in the frame 1, under an idle sprocket 12 freely journalled on an axis 13 secured to the opposite side of the supporting frame 9, over an idle sprocket 14 freely journalled on a fixed axis 15 carried by the frame 1 under an idle sprocket 16 freely journalled on a fixed axis 17 carried by the frame 1 and thence back to the drive sprocket 3.

The supporting frame 9 is journalled for reciprocal rotative movement about the axis of the driven shaft 11 with its said axis of rotation equidistant from the axes of the idle sprockets 7 and 12. The frame 9 is provided with a downwardly extending arm 18 to which is pivotally attached, as by means of a pin 19, an eccentric rod or arm 20 whose other ends surround an eccentric 21 fixed to and driven by the drive shaft 2. The outer end of the eccentric rod 20 is preferably adjustably connected to the arm 18, as by means of a plurality of holes 22 adapted to receive the pin 19. This adjustment provides for varying the throw of the frame 9, which in effect serves as a crank arm for the idle sprockets 7 and 12 and the portions of the chain 4 adjacent thereto.

From the foregoing it will be seen that upon rotation of the shaft 2 power is transmitted by means of the chain and sprocket power train to the driven shaft 11; such power train being in constant driving engagement between said shafts. However, as the drive shaft 2 rotates, the eccentric 21 is rotated and thereby reciprocates the frame 9 and the idle sprockets 7 and 12 carried thereby. This reciprocation from the broken-line position to the full-line position changes the phase relationship of the chain 4 with respect to the driven sprocket 10 and shaft 11—advancing the chain on its driving side of the sprocket 10 and retarding it on the other side of the sprocket intermediate the sprockets 10 and 7. Conversely, from the full-line position to the broken-line position the feed side of the chain 4 intermediate the sprockets 12 and 10 is retarded in its phase relationship with the sprocket 10 and a portion of the chain intermediate the sprockets 10 and 7 is advanced. This results in a speeding up of the rotation of the driven shaft 11 when the frame 9 is in a full-line position and a slowing down of shaft 11 when said frame is in a broken-line position. As will be more fully described following, adjustment of the pivot point 19 effects a variation in the type of movement imparted. In general the crank stroke may be lengthened to a degree that will cause the driven shaft 11 an intermittent reversal of motion after it has been slowed down from a movement in one direction to 0, and after said reversal of movement the forward movement will continue again to the maximum speed; the crank throw may be shortened to an extent where the rotation of shaft 11 is continuous but is intermittently varied during each cycle of revolution; whereas an intermediate length of crank throw may be selected which will cause the shaft 11 to gradually slow down from its maximum speed, come to a stop, or as near a stop as desired, and gradually accelerate back to its maximum speed again during each cycle of revolution. A cycle of revolution is one revolution of the driving shaft, which may be geared to the driven shaft in the desired ratio.

Modification of sprocket and chain drive

In Figs. 5 and 6 a somewhat simplified modification of a sprocket and chain power drive is illustrated which eliminates the three idle sprockets 5, 14 and 16 comprised in the embodiment previously described and contains a slight rearrangement of the parts: otherwise this embodiment is quite similar structurally to that previously described and in order to facilitate an understanding of the similarities correspondingly similar parts will be designated by the same numerals with the prime—'—suffix added. Referring more particularly to Figs. 5 and 6, a suitable supporting frame is designated as 1' to which is journalled a driver such as the drive shaft 2' to which is fixed a driving sprocket 3' in driving engagement with a sprocket chain 4' which passes over an idle sprocket 7' freely journalled on an axis or stub shaft 8' fixed to the frame support 9', thence around the driven sprocket 10' which is fixed to the driven shaft 11', thence outwardly over an idle sprocket 12' which is freely journalled on an axis or stub shaft 13' likewise carried by the supporting frame 9', and thence back to the driving sprocket 3'. The supporting frame 9' is freely journalled on a stub shaft 23 which is fixed to the main frame 1', and extends outwardly beyond the axis 8' to provide an arm 18' having a slot 22' providing for adjustable setting of a pin 19' which serves to connect one end of the cam rod 20' to the frame 9'. The other end of the cam rod 20' is in driven engagement with an eccentric 21' which is fixed to the driving shaft 2' for rotation therewith.

From the foregoing it will be obvious that upon rotation of the driving shaft 2' at a substantially uniform continuous motion power is positively transmitted through the chain and sprocket drive to the driven shaft 11' to impart the desired variable intermittent motion thereto in accordance with the principle previously described with reference to Fig. 1. The crank throw of the supporting frame 9' is represented by the distance $a$ in Fig. 5 and by varying the position of the pin 19' in the slot 22' this dimension may be varied to effect the desired intermittent motion of the driven shaft 11'. A few illustrative speed curves are shown in Fig. 9 to give a better understanding of the character of intermittent motion possible in accordance with this invention.

Referring more particularly to Fig. 9, the straight line drawn at 45° represents a uniform speed curve and is given for purposes of reference, the curves plotted between an abscissa representing the degrees of rotation and an ordinate representing the travel per revolution. The speed curve designated A is plotted for a ⅝" crank throw and illustrates that for a throw of this character a variation in speed is effected intermittently corresponding to each revolution of the shaft which is brought to a relatively slow movement while kept in continuous rotation. Curve B is plotted with a 1⅜" crank throw and indicates that with this character of setting not only is the speed of rotation of the shaft varied during each revolution but the shaft is momentarily brought to rest between the points of the curve designated X and Y. In curve C the crank throw is 1¼" and illustrates that with this setting the shaft during each revolution is brought to rest and given a reverse movement between the points marked Z and W and thereafter assumes its forward movement.

Gear drive embodiment

Figure 8:
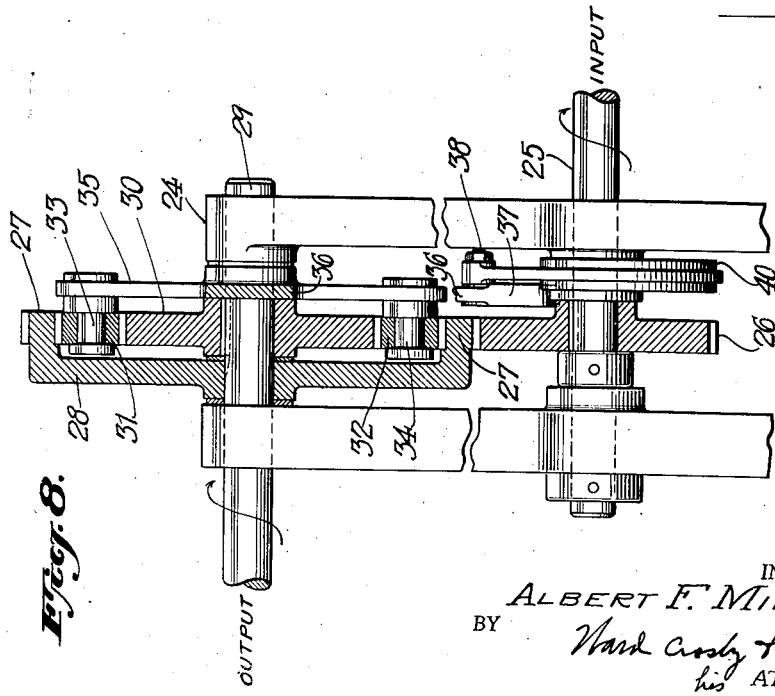
Fig. 8 is a side elevation of the device shown in Fig. 7, somewhat diagrammatically shown along the development lines 8—8 of Fig. 7 for purposes of illustration, and with certain parts broken away.

Figs. 7 and 8 show an embodiment of the invention in which the same principles of operation previously described are presented but in which a gear train is employed for transmitting power from the driving to the driven shaft, instead of the chain and sprocket, as employed in the previous embodiments. Referring more particularly to Figs. 8 and 7, a suitable supporting frame is designated as 24 and has suitably journalled therein a driving shaft 25 adapted to be continuously rotated at a substantially uniform speed. This shaft carries fixed thereto a driving gear 26 which is in driving engagement with external teeth provided on a ring gear 27 formed on a web or spider support 28 freely journalled for rotation about the axis of a driven shaft 29. The driven shaft 29 has suitably secured thereto for rotation therewith a sun gear 30 whose teeth are spaced inwardly from and concentric with internal teeth formed on the ring gear 27. A plurality of planet gears such as the idle gears 31, 32 are freely journalled on stub shafts 33, 34 which are carried on a supporting frame 35 which is freely journalled on the driving shaft 29. The frame 35 (Fig. 7) is provided with an arm 36 whose outer end is provided with a slot 37 in which is adjustably positioned a pin 38 serving to pivotally connect the arm 36 to an eccentric rod 39 whose other end operatively engages an eccentric 40 which is secured to the driving shaft 25 for rotation therewith.

From the foregoing it will be seen that when the shaft 25 is rotated power is transmitted through the gear 26 to the ring gear 27 and through the intermediate planet gears 31—32 to the driven gear 30 and thence delivered to the driven shaft 29; and during each revolution of the shaft 25 the eccentric and crank arm mechanism oscillates the planet gears 31—32 to effect an intermittent variation in the rotation of the shaft 29. As in the previously described embodiments, this variation may be determined as to degree and kind in accordance with the adjustable setting of the pin 38 in the slot 37 to provide for different crank throw dimensions.

Having thus described my invention with particularity with reference to the preferred embodiments of the same, it will be obvious to those skilled in the art, after understanding my invention, that other changes and modifications may be made therein without departing from the spirit and scope of the invention, and I aim in the appended claims to cover such changes and modifications as are within the scope of the invention.

What I claim is:

1. In a variable intermittent drive mechanism the combination of a circular drive sprocket, a circular driven sprocket, a chain interconnecting said sprockets in driving relationship, a pair of spaced apart idlers around one of which said chain passes in its travel from the drive sprocket to the driven sprocket and around the other of which said chain passes in its travel from the driven sprocket to the drive sprocket, a support for said idlers pivotally mounted on an axis equidistant from said idler axis, and means apart from said chain for oscillating said support and idlers in timed relationship with said drive shaft, said parts being so constructed and arranged that said chain is maintained in positive driving engagement with said drive and driven sprockets at all times and is varied in its phase relationship with said driven sprocket by the oscillation of said idlers.

2. In a variable intermittent drive mechanism the combination of a drive shaft and sprocket, a driven shaft and sprocket, a chain interconnecting said sprockets in driving relationship, a pair of spaced apart idlers around one of which said chain passes in its travel from the drive sprocket to the driven sprocket and around the other of which said chain passes in its travel from the driven sprocket to the drive sprocket, a crank arm on which said idlers are journalled and which is pivotally mounted intermediate said idlers, an eccentric rod adjustably connected at one end to said crank arm and in operative engagement at its other end with an eccentric, and said eccentric secured to said drive shaft for rotation therewith, said parts being so constructed and arranged that said chain is maintained in positive driving engagement with said drive and driven sprockets at all times and is varied in its phase relationship with said driven sprocket by the oscillation of said idlers.

3. In a device of the character described, a substantially constant speed driving member, a member to be driven at variable speed, chain means in positive driving engagement between said driven and driving members for transmitting power from the said driving member to the said driven member, control means comprising two rotatable members engaging said chain means on opposite sides of said driven member and whose axes are pivotally mounted for movement in the same direction of rotation about a common center for changing the cyclical timed relationship of said power-transmitting means with respect to said driven member while maintaining a constant relationship with respect to said driving member, and variable speed actuating means driven from said constant speed driving member for imparting variable motion to said control means, whereby the speed of said driven member is varied during each cycle of operation in accordance with the movement of said control means.

4. In a device of the character described, a first shaft to be substantially continuously rotated and a second shaft to be intermittently rotated about an axis having a fixed spaced relationship to said first shaft, a power-transmitting mechanical train comprising a chain drive in constant positive interconnecting engagement with said shafts, control means comprising two rotatable members engaging said chain means on opposite sides of said driven member and whose axes are pivotally mounted for movement in the same direction of rotation about a common center for changing the cyclical timed relationship of said power-transmitting means with respect to said second shaft while maintaining a constant relationship with respect to said first shaft, and variable speed actuating means driven from said first shaft for imparting intermittent variable motion to said control means, whereby the rotation of said second shaft is interrupted during the continuous rotation of said first shaft.

5. In a device of the character described, a substantially constant speed driving member, a shaft to be driven at variable speed, a power-transmitting chain drive in constant positive interconnecting engagement with said shafts, control means comprising two rotatable members engaging said chain means on opposite sides of said driven member and whose axes are pivotally mounted for movement in the same direction of rotation about a common center for changing the cyclical timed relationship of said power-transmitting means with respect to said second shaft while maintaining a constant relationship with respect to said first shaft, and variable speed actuating means driven by said first shaft for imparting intermittent variable motion to said control means, whereby the rotation of said second shaft is interrupted during the rotation of said first shaft.

ALBERT F. MILLER.